United States Patent [19]

Nguyen et al.

[11] Patent Number: 5,541,932
[45] Date of Patent: Jul. 30, 1996

[54] CIRCUIT FOR FREEZING THE DATA IN AN INTERFACE BUFFER

[75] Inventors: Uoc H. Nguyen, Long Beach; Sam Su, Rowland Heights; Li-Fung Cheung, Alhambra; George Apostol, Santa Clara, all of Calif.

[73] Assignee: Xerox Corporation, Stamford, Conn.

[21] Appl. No.: 383,032

[22] Filed: Feb. 3, 1995

Related U.S. Application Data

[63] Continuation-in-part of Ser. No. 259,095, Jun. 13, 1994, abandoned.

[51] Int. Cl.⁶ .................................................. H04L 12/40
[52] U.S. Cl. ........................................ 370/85.9; 370/85.1
[58] Field of Search ............................... 370/85.1, 85.2, 370/85.6, 85.7, 85.9, 85.11, 85.13; 340/825.15, 825.5; 364/DIG. 1; 395/280, 306, 308, 309, 872, 875

[56] References Cited

U.S. PATENT DOCUMENTS 5,029,124  7/1991  Leahy et al. ............................ 370/85.1
5,191,581  3/1993  Woodbury et al. ..................... 370/85.9

*Primary Examiner*—Wellington Chin
*Assistant Examiner*—Huy D. Vu
*Attorney, Agent, or Firm*—Robert Cunha

[57] ABSTRACT

A circuit for enabling data transfer between one data bus connected to a number of devices, such as accelerator cards, and a second data bus, such as one found in a computer. The two data busses are connected by a number of FIFO buffers, and an arbitrator selects a source and destination for each packet. The circuit allows the computer to freeze the data in any or all buffers so that it can be inspected and changed if necessary, but only after the entire current packet for the selected buffer or buffers has been transferred.

1 Claim, 4 Drawing Sheets

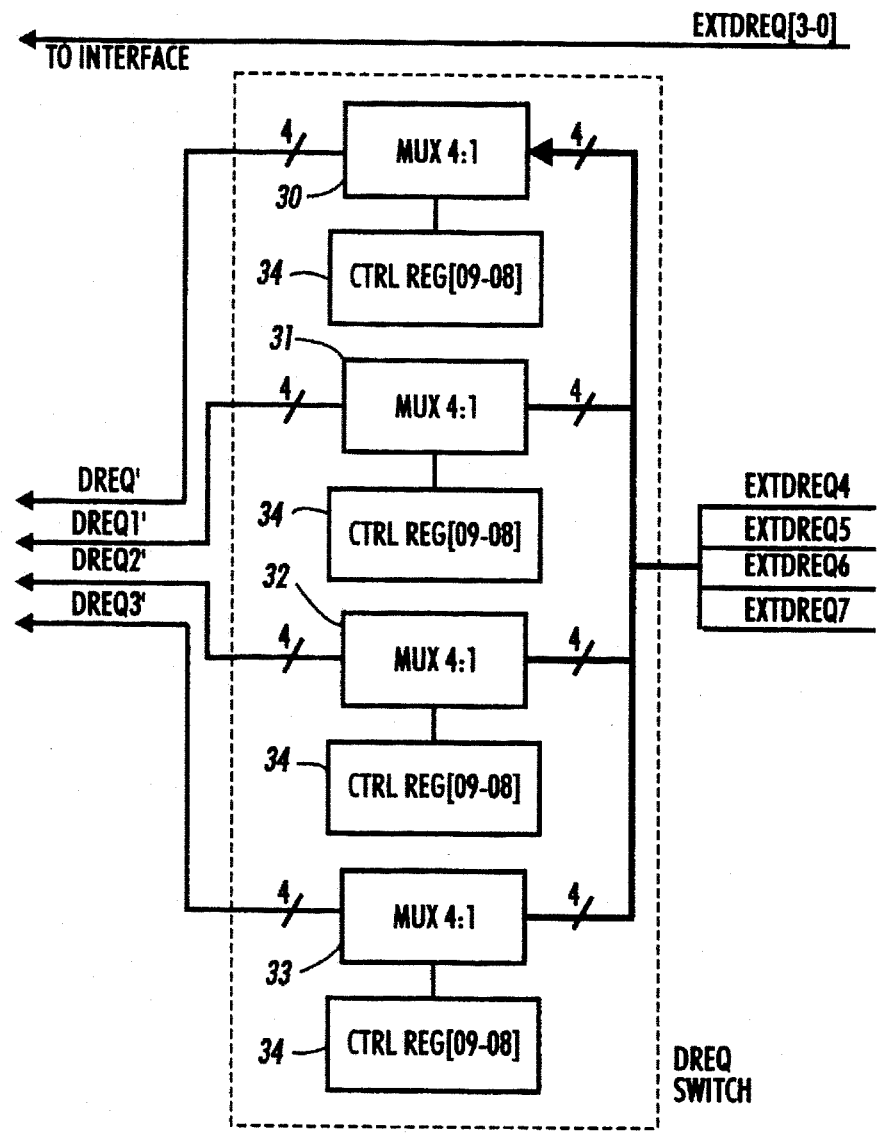

ctrl bits [09-08]='00' position4--(default)  ctrl bits [11-10]='00' position4
ctrl bits [09-08]='01' position5             ctrl bits [11-10]='01' position5--(default)
ctrl bits [09-08]='10' position6             ctrl bits [11-10]='10' position6
ctrl bits [09-08]='11' position7             ctrl bits [11-10]='11' position7 ctrl bits [13-12]='00' position4             ctrl bits [15-14]='00' position4
ctrl bits [13-12]='01' position5             ctrl bits [15-14]='01' position5
ctrl bits [13-12]='10' position6--(default)  ctrl bits [15-14]='10' position6
ctrl bits [13-12]='11' position7             ctrl bits [15-14]='11' position7--(default)

Normal states: ExtDReq0 is paired with ExtDReq4 for an L2L transfer
               ExtDReq1 is paired with ExtDReq5 for an L2L transfer
               ExtDReq2 is paired with ExtDReq6 for an L2L transfer
               ExtDReq3 is paired with ExtDReq7 for an L2L transfer

*FIG. 2*

CIRCUIT FOR FREEZING THE DATA IN AN INTERFACE BUFFER

This application is a continuation-in-part of application Ser. No. 08/259,095, filed Jun. 13, 1994, now abandoned.

BACKGROUND OF THE INVENTION

An improved interface circuit for allowing data to be transmitted between two data busses wherein the interface contains a FIFO buffer per channel for transmitting the data in either direction, and wherein the operation of the buffers can be frozen at a point in time to allow the CPU to inspect, and to modify if necessary, the data in the control circuit and buffers prior to enabling the buffers to resume regular operation.

In normal computer systems which process data in the form of numbers or character coded text, the data rate is usually modest, perhaps eight bits for a character and four bits for a numerical digit, resulting in thousands of bits per page. In this case the system is normally able to process the data in the software. However, in systems that process images, the data rates are very high, easily reaching up into the millions of bits per page, and to allow the computer to keep up with the printer speed, "accelerator" cards are frequently used. These are specially designed hardware circuits which accomplish specific image handling functions such as compression, decompression and image rotation.

Normally, these accelerator cards are extra circuit boards which may be plugged into the CPU backplane and transmit data over the existing data bus. However, in high speed systems the amount of data transmitted between accelerator cards overloads the data bus. One solution is to provide a separate data bus for the accelerator cards, herein called a local, or "L" bus, in addition to the system, or "S" bus. Then, between these two busses there must be an interface circuit.

It frequently happens that after data is decompressed or rotated, it will be sent to a printer. Similarly, data received from a scanner may be compressed. Therefore, from a system optimization viewpoint, it is appropriate that I/O devices such as the scanner and printer also be connected to the L bus.

On the other hand, the printer may operate at much higher speeds than does the disk and scanner. In this case, large amounts of data must be temporarily stored in the main CPU memory prior to printing. This necessitates the frequent transmission of large amounts of image data across the interface circuit between the L bus and the S bus.

A common problem with this kind of interface circuit is that it is handling large amounts of data in two directions based on instructions from various cards, and it may, under certain conditions, either be handling the data improperly or not in the most optimum way. An example of the first condition is where the system has a fault, and the maintenance person is trying to find out where the fault is occurring. An example of the second is where the interface is instructed that the following transmission is the output of the compressor. Since the compression ratio is variable, the length of the transmission is not known beforehand. Therefore, when requesting a transmission, the compressor card will assume a worst case compression ratio of, for example, 1 to 1, and reserve that much time. It would be convenient if the CPU could freeze the interface after half or two thirds of the allotted time has elapsed to see if the transmission has been completed, so that the interface could be used for another purpose.

In prior systems, the stoppage of the interface to inspect the buffer contents has, itself, been a source of faults since any disruption of the data by stopping and starting the buffer will frequently result in lost or displaced data bits. Therefore, the general rule has been that the buffer is never stopped. As explained above, this results in making troubleshooting more difficult and data transmissions more time consuming.

SUMMARY OF THE INVENTION

This invention overcomes these difficulties by providing an interface which transfers information in the form of packets. In operation, one Data (D) Request will enable one packet to be transmitted by the interface. A number of D Requests will then be required to transmit the entire transmission. This number of D Requests is normally combined into a control statement called a channel control block (CCB), and stored. As packets are transmitted the control block packet count is decremented.

The interface is designed so that when a "Pause" is received, the current transmissions in both directions will continue to the end of the current packets, and then stop. At this point the buffer data, as well as the control information, can be inspected and changed if appropriate by the CPU, and then restarted at the next D Request. During this pause, the CCB's can also be inspected and modified without disrupting the system.

BRIEF DESCRIPTION OF THE DRAWINGS

FIG. 2 shows the programmability of the D Request lines.

DETAILED DESCRIPTION OF THE INVENTION

Figure 1:
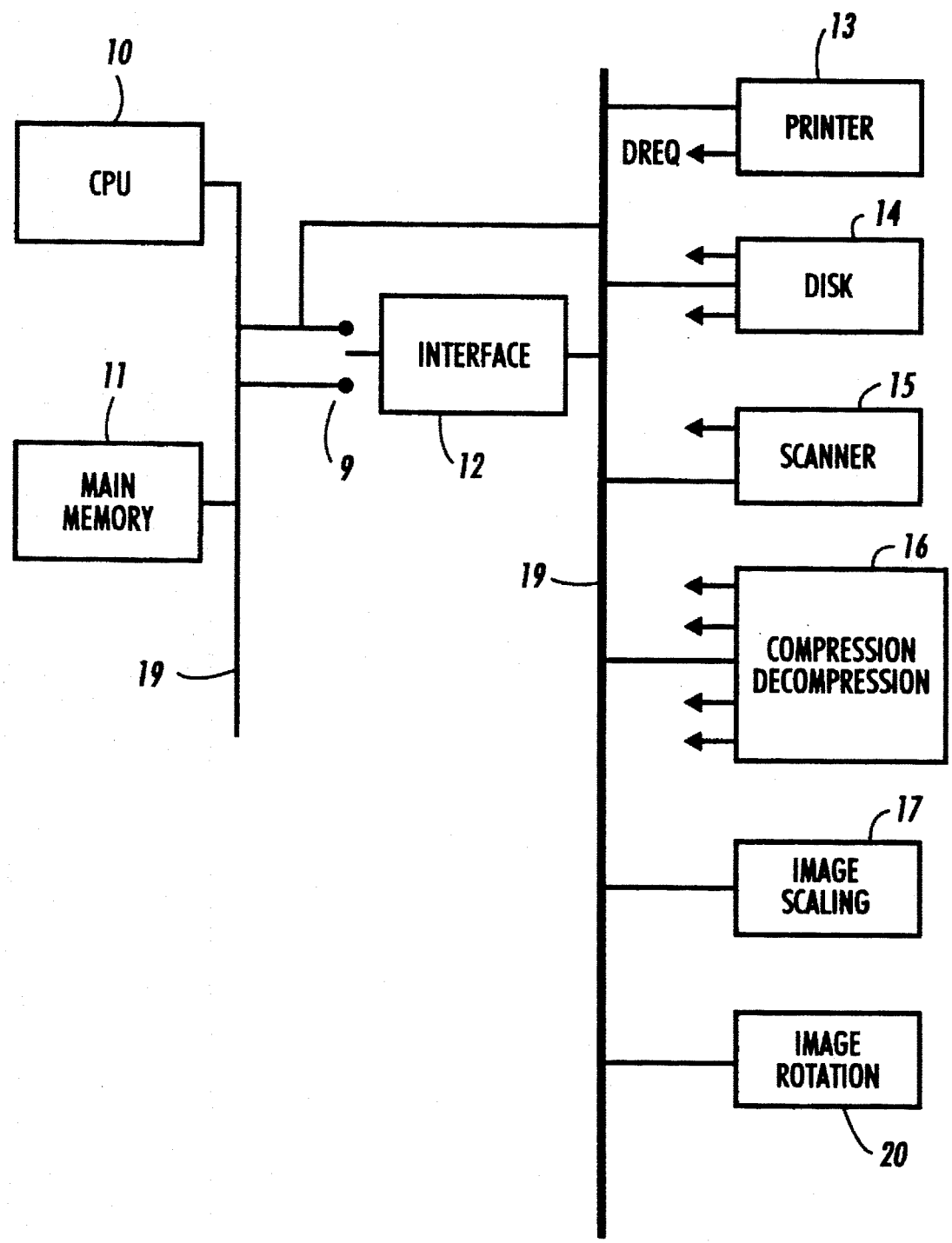
FIG. 1 is an overall block diagram of the system.

FIG. 1 shows the CPU 10 and the system memory 11 connected by a System S Bus 18. For high speed image handling there is provided any number of accelerator cards such as a compressor/decompressor card 16 and an image rotator 20. There are connected by the local L Bus 19. Since data from the system scanner 15 is frequently compressed, and the data to the printer is frequently decompressed, the scanner interface card 15 and the printer driver 13 are also connected to this L Bus 19. Other examples of cards that may be attached to the L Bus are a disk driver 14 and an image scaler 17.

Finally, the L Bus 19 and the S Bus 18 are connected by the interface 12 which is essentially two FIFO buffers per channel, one for each direction (S to L and L to S), with one exception. Since it frequently happens that the transmission of data is between cards on the L Bus, the L to S buffer is configured so that the transmission will be from the L Bus back to the L Bus. This is illustrated conceptually by switch 9, although any other equivalent software or hardware alternative could be used. In other words, for example, the decompressor 16 output is not sent directly to the printer 13 but is instead sent through the interface buffer 12. This allows the freezing, and possible changing, of the data to occur.

When a device needs data, or when a device wants to transmit data, it sends out a D Request (DReq) on a control line to the Interface 12 which, in this embodiment, can store up to eight, one for each channel. This D Request can be a request to send or receive information, in the case of some cards like the compressor decompressor that can do both. Other cards, which can only transmit or receive. like the printer driver which can only receive, can only output one kind of D Request and so have only one control line. Using these rules, the compressor/decompressor card actually needs 4 lines, since the compressor function needs 2 (one to identify that data is needed to be input, and one to identify that data needs to be output) and, similarly, the decompressor needs two. Considering that the interface has only eight request lines, a limited number of cards can be attached to the L bus in this embodiment. However, if it is required, the number of D Request lines can be expanded to a number larger than 8.

The following is an example of how control lines are paired.

| 0 | Decompressor | In |
|---|---|---|
| 1 | Compressor | In |
| 2 | Disk | In |
| 3 | IOT | In |
| 4 | Decompressor | Out |
| 5 | Compressor | Out |
| 6 | Disk | Out |
| 7 | Scanner | Out |

Since the circuit is limited to activating and pairing only one line from the first four and one line from the second four to form a DReq, it is frequently necessary that all input functions and output functions are grouped together as shown. Examples of possible transmissions between devices would be, transmission of raw data from the scanner through the interface, L (bus) to L (bus) to the compressor, and then, through the interface, L to L, to the disk for storage. This total transfer requires two trips through the interface and would therefore require two D requests. Another example would be compressed data from the disk through the interface, L to S, to the main memory for temorary storage, through the interface, S to L, to the decompressor for decompression into an image, and transmission of that image through the interface, L to L, to the printer for printing. This would require three D requests. This total sequence would result in the normal process of scanning and printing a picture, and assumes a disk that runs much slower than the printer. If the disk were as fast as the printer, data could be sent directly from the disk to the printer. Similarly, data could be sent from the scanner to the printer if the scanner was as fast as the printer.

An example of a data transfer that was not designed into the original product, but that was later determined to be a useful option is the transfer of data from the decompressor to the compressor. This would be useful when the data is compressed in one format and will eventually be needed in a different format. This is an example of a process that would have required a redesign of the interface board in a prior art interface, but one which can be provided easily by software control in this embodiment.

As shown in the example above, let us assume that line 7 is attached to the scanner "Out" data request control line, and that line 1 is attached to the Compressor "In" request control line, and that the interface has been configured to connect line 1 to 7. Now if both lines 1 and 7 are active, the interface will take data from the scanner on the L bus and send it back out on the L bus to the compressor, which is the first step described in the previous paragraph. All other transfers are accomplished similarly.

Any set of lines, such as 0–3 being coupled to 4–7 respectively, can be assigned as defaults, but can be changed in real time to any other arrangement. However, no device changes are allowed from the first group to the second. In other words, the decompressor must use one of the second four lines, and both the printer driver and the disk driver must use one of the first four lines. Thus,, there can never be a transfer of data from the compressor to the scanner. Also, one line is used in an S to L or L to S transfer since only one device has to be declared, the other is understood to be the CPU Memory since it is the only device on the S bus. However, in the case of an L to L transfer, two request lines are needed to name the two devices. To restate this relationship, if the first four lines are considered to be group A and the second four are considered to be Group B, then an L to L transfer is possible only between D Requests belonging to different groups, and no L to L transfer is allowed between requests of the same group.

FIG. 2 shows how this matching of requests can be changed by the software. The circuit shown is for one of the two groups and is made up from four multiplexers 30–34 and one control register 34 having 8 control bits. Each mux 30–33 has one output and is labelled DReq 0 through 3. The inputs are D Requests numbered 4 through 7. The control register is loaded by the CPU so that each multiplexer will choose the predetermined input to be used as its output. In this way, for example, Mux 30 can choose any of D Requests 1–7 to use as its output D Request 0. In the default condition 4 will go to 0, 5 to 1, etc. This default condition will normally be used for L to L transfers. All of the other possibilities must be programmed. As shown, D Requests 0-3 are always left in their unmodified state and only the last four D Requests are multiplexed.

Each possibility is allowed once as shown in the example below, but it happens that these pairings occasionally become mis-programmed. To prevent this, a small array is used to check that the possibilities are selected only once. First, the contents of the register is sent to an OR circuit to determine if each select line 4–7 is selected at least once. Then all the OR output bits are checked to make sure that all have been selected at least once. An error is indicated by a 0 output bit, and the error interrupt is set.

EXAMPLE

DReq0 is paired with DReq6, the control bits [09–08] are '10'.

DReq 1 is paired with DReq 4, the control bits [11–10] are '00'.

DReq2 is paired with DReq 7, the control bits [13–12] are '11'.

DReq 3 is paired with DReq 5, the controls bits [15–14] are '01'.

The algorithm is as follows:

1. A table reflecting the state of the switches is created:

| DReq paired with | 7 | 6 | 5 | 4 | |
|---|---|---|---|---|---|
| DReq0 | 0 | 1 | 0 | 0 | (DReq6 is used, therefore a '1' is set at position 6) |
| DReq1 | 0 | 0 | 0 | 1 | |
| DReq2 | 1 | 0 | 0 | 0 | |
| DReq3 | 0 | 0 | 1 | 0 | |

2. The columns are Logical ORed into a single row.

3. The bits of the newly created row are then logicallu ANDed together

4. The result of the ANDing should be a 'ONE' if the programming is correct.

| | Correct programming | | | |
|---|---|---|---|---|
| position | 7 | 6 | 5 | 4 |
| DReq0 | 0 | 1 | 0 | 0 |
| DReq1 | 0 | 0 | 0 | 1 |
| DReq2 | 1 | 0 | 0 | 0 |
| DReq3 | 0 | 0 | 1 | 0 |
| Column OR | 1 | 1 | 1 | 1 |
| Row AND | 1, and no error interrupt is activated. | | | |

| | incorrect programming | | | |
|---|---|---|---|---|
| position | 7 | 6 | 5 | 4 |
| DReq0 | 0 | 1 | 0 | 0 |
| DReq1 | 0 | 1 | 0 | 0 |
| DReq2 | 1 | 0 | 0 | 0 |
| DReq3 | 0 | 0 | 1 | 0 |
| Column OR | 1 | 1 | 1 | 0 |
| Row AND | 0 and the error interrupt is set | | | |

Figure 3:
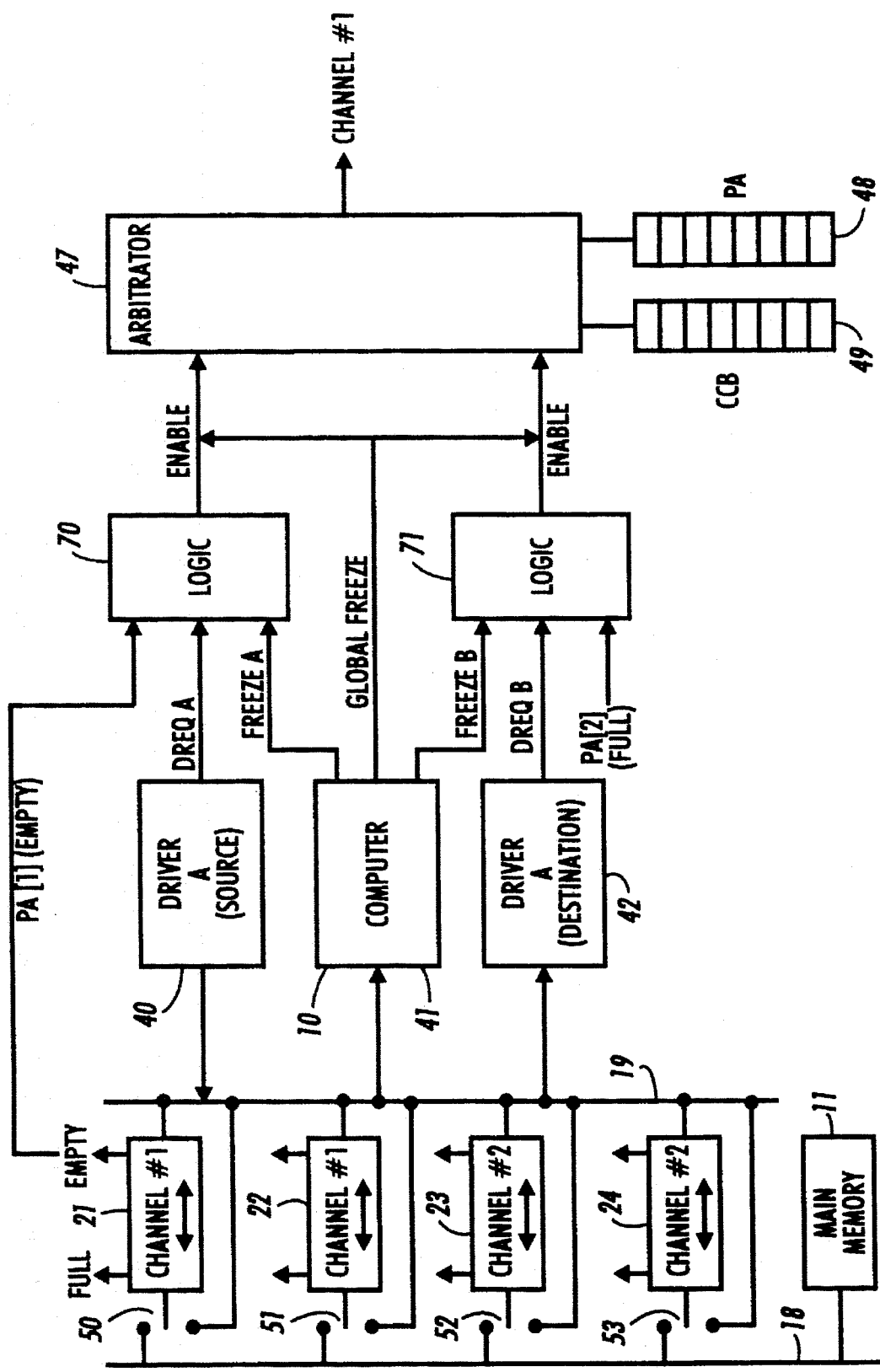
FIG. 3 is a block diagram of two channels of the interface buffers and surrounding circuitry.

FIG. 3 shows the organization of the FIFO buffers and surrounding circuitry. Two of the eight channels are shown here. Each channel has two ping pong FIFO's, each of which can store 1 packet, each packet being 32 bytes long. In addition, each FIFO outputs "full" and "empty" signals.

Data transfers are controlled by blocks of information called Chain Control Blocks (CCB's) which are loaded into the CCB register 49 from the computer 10. Each contains the address of the source and destination of the data packet to be transferred, the width of the data (8 or 16 bits) and the packet count (in 32 byte packets). In a typical Direct Memory Access (DMA) operation, a packet of data is to be put in memory starting at a designated location, and the data will be entered directly without intervention by the CPU. In this application the data will either be transmitted between the main memory and a device in a DMA sequence, or between two devices, using the same sequence.

The examples of devices shown here are labelled device A, 40, and device B, 42, and, because the pairings are under software control, as explained above, these devices could be paired to any two of the eight channels. In this example, device A is shown as a source of data and device B is shown as a data sink.

When device A is ready to transmit data it will issue a data request, DReqA. In addition, in this example, when the buffer 21 to be used is empty, and therefore available to accept data, logic 70 will accept the buffer empty signal as the packet available (PA) signal, to generate an enable signal which is presented to the arbitrator 47, indicating that the buffer 21 and device 40 are ready to transfer data. The packet available signal is also stored in the arbitrator PA register 48.

The logic block 71 for device B is similar except that, because the device is a data destination, the packet available signal will be generated from the "full" signal from the buffer that has the data.

In the event that several data channels are requesting a data transfer at the same time, the arbitrator 47 will inspect the logic block 70, 71 outputs and decide as a matter of priority which device will get control for the next transmission. The output of the arbitrator is a number specifying the device and buffer.

In the event that a single channel is to be frozen, a freeze signal from the computer 10 will be applied to the associated one of the logic blocks 70, 71. This has the effect of blocking the enable signal to the arbitrator. In the alternative, a global freeze can be applied to all enable lines, which has the effect of blocking all DReq's. When a channel is blocked, the current packet transfer will be completed, but the transmission of the next packet will not start, and the data in all of the buffers 21–24, and all of the registers such as the CCB register 49 and main memory 11, can be examined or modified. Finally, the freeze signal is removed and operation will continue.

Figure 4:
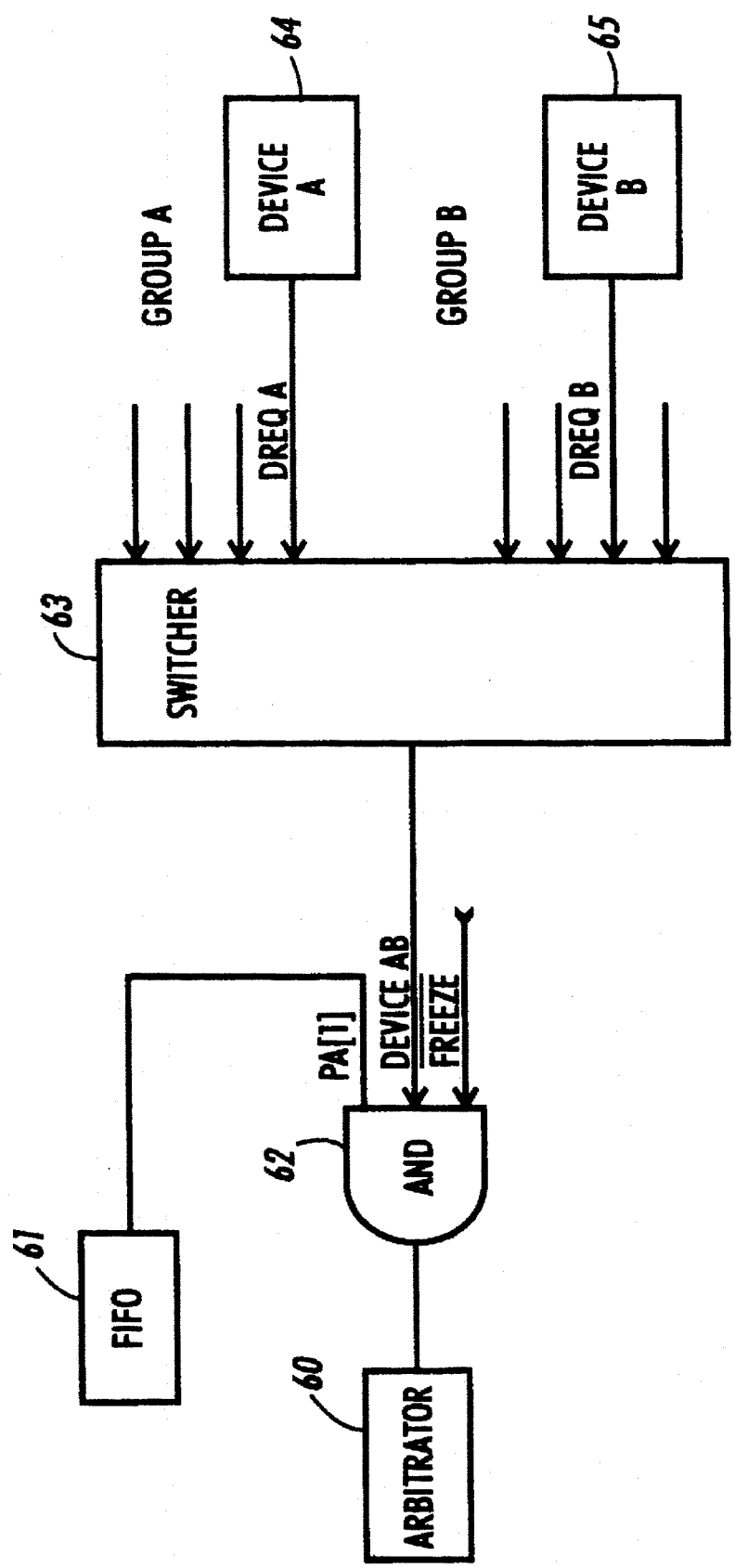
FIG. 4 shows an alternative embodiment of the Logic connecting to the devices and the arbitrator.

An alternative embodiment of the logic connecting the devices and the arbitrator is shown in FIG. 4. Eight DREQ inputs from devices 64, 65 are shown for the switcher 63, four from group A, four from group B. The switcher is configured to match pairs of inputs and will output a combined output, here showing, as an example, a combined AB output. If a packet is available from, or to, the FIFO 61, and if the Device AB signal is present, and if the "not freeze" signal is high, the gate 62 will generate an output to the arbitrator.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A circuit for allowing the transfer of data between first and second data busses, comprising:

a first buffer for coupling packets from said second bus to said first bus, and for generating an empty signal, a second buffer for coupling packets from said first bus to said second bus, and for generating a full signal, a source device for transmitting packets of data to said second bus and for generating a source data request signal when said source device requires that data be output, a destination device for receiving packets of data from said second bus and for generating a destination data request signal when said destination device requires data to be input, means for generating a freeze signal for each device, first logic means for receiving said source data request signal, said buffer empty signal and said source device freeze signal, and for generating a first output signal therefrom only if said source device freeze signal is inactive, second logic means for receiving said destination data request signal, said buffer full signal and said destination device freeze signal, and for generating a second output signal therefrom only if said destination device freeze signal is inactive, and an arbitrator responsive to said first and second output signals for generating an enabling signal for enabling either a transfer of data from said source device to said first buffer or a transfer of data to from said second buffer to said destination device, said arbitrator being further adapted to allow the completion of the transfer of a packet of data when said enabling signal is interrupted by a freeze signal during the transmission of a packet.

* * * * *